United States Patent
Dice et al.

(10) Patent No.: US 10,447,686 B2
(45) Date of Patent: Oct. 15, 2019

(54) AUTHENTICATED AND FUNCTIONAL SMS LINKS

(71) Applicant: Dice Corporation, Bay City, MI (US)

(72) Inventors: Clifford Dice, Bay City, MI (US); Gerald Corrion, Bay City, MI (US)

(73) Assignee: Dice Corporation, Bay City, MI (US)

( * ) Notice: Subject to any disclaimer, the term of this patent is extended or adjusted under 35 U.S.C. 154(b) by 93 days.

(21) Appl. No.: 15/496,603

(22) Filed: Apr. 25, 2017

(65) Prior Publication Data
US 2017/0310651 A1 Oct. 26, 2017

Related U.S. Application Data

(60) Provisional application No. 62/327,109, filed on Apr. 25, 2016, provisional application No. 62/346,140, filed on Jun. 6, 2016.

(51) Int. Cl.
| | |
|---|---|
| H04L 29/06 | (2006.01) |
| H04L 29/08 | (2006.01) |
| H04W 4/14 | (2009.01) |
| H04L 12/24 | (2006.01) |
| H04W 4/90 | (2018.01) |
| G08B 25/00 | (2006.01) |
| G08B 25/08 | (2006.01) |
| H04W 12/06 | (2009.01) |

(52) U.S. Cl.
CPC ......... *H04L 63/083* (2013.01); *G08B 25/001* (2013.01); *G08B 25/08* (2013.01); *H04L 41/22* (2013.01); *H04L 41/28* (2013.01); *H04L 67/02* (2013.01); *H04L 67/26* (2013.01); *H04L 67/306* (2013.01); *H04W 4/14* (2013.01); *H04W 4/90* (2018.02); *H04W 12/0602* (2019.01); *H04L 2463/121* (2013.01)

(58) Field of Classification Search
CPC .................................................... H04L 63/062
USPC ........................................................... 726/6
See application file for complete search history.

(56) References Cited

U.S. PATENT DOCUMENTS

| | | |
|---|---|---|
| 6,400,265 B1 | 6/2002 | Saylor et al. |
| 7,734,020 B2 | 6/2010 | Elliot et al. |

(Continued)

OTHER PUBLICATIONS http://web.archive.org/web/20160401102837.https://bitly.com/pages/tour Unleas the Power of the Link, Bitly Product Tour, Apr. 1, 2016, 7 pages.

(Continued)

*Primary Examiner* — Evans Desrosiers
(74) *Attorney, Agent, or Firm* — Brooks Kushman, P.C.

(57) ABSTRACT

A computer system for creating pre-authenticated, functional URLs within SMS messages is disclosed. The computer system includes a computer having non-transitory memory for storing machine instructions that are to be executed by the computer. The machine instructions when executed by the computer implement the following functions: receiving a login ID and passcode of an alarm management system user; receiving a specific function to be utilized by the alarm management system user; generating a URL that embeds the login ID, passcode and specific function to create a pre-authenticated, functional URL; combining a text message string with the pre-authenticated, functional URL to create an SMS message; and transmitting the SMS message.

17 Claims, 12 Drawing Sheets

(56) References Cited

U.S. PATENT DOCUMENTS

| | | |
|---|---|---|
| 8,896,436 B1 | 11/2014 | Morehead |
| 2006/0176167 A1* | 8/2006 | Dohrmann ........... G08B 25/001 |
| | | 340/506 |
| 2009/0288011 A1* | 11/2009 | Piran ................ G08B 13/19693 |
| | | 715/720 |
| 2013/0154822 A1* | 6/2013 | Kumar ................ G08B 25/005 |
| | | 340/501 |

OTHER PUBLICATIONS

Risley, James, http://www.geekwire.com/author/jamesrisley/, Auth0 secures $6.9M to help app developers simplify user logins, Jun. 24, 2015, 7 pages.
Rauch, Ricardo, https://auth0.com/blog/designatauth0/, Engineering The Design Proces at Auth0, Our lessons in Defining a Cohesive Design Language Across All Our Products, Jun. 9, 2015, 9 pages.
http://web.archive.org/web/20160401142547/http://tinyurl.com/, TinyURL.com, Making Over a Billion Long URLs Usable! Serving billions of redirects per month, Apr. 1, 2016, 2 pages.

* cited by examiner

MON Name: DICE Corporation - 3
 13:00:01 *L T C* LATE TO CLOSE
 15:36:25 SIGNAL RECEIVED: (E130)
>E130
    BURGLARY ZONE
 15:37:54 SMS NOTIFICATION SENT
    SMS type: NOTIFICATION
    To: 19892953340
 15:37:55 SMS NOTIFICATION SENT
    SMS type: NOTIFICATION
    To: 19892740858
 15:37:57 SMS NOTIFICATION SENT
    SMS type: NOTIFICATION
    To: 19894157880
TUE Name: DICE Corporation - 3
 08:00:30 SIGNAL RECEIVED: (E130)
>E130 001
    BURGLARY ZONE 001
 08:00:47 SMS NOTIFICATION SENT
    SMS type: NOTIFICATION
    To: 19892953340

Fig. 11

| Contact Details | | |
|---|---|---|
| Contact Name | Jerry | |
| Phone Number | | Format |
| Phone Extension | | |
| Opening ID | | Closing ID |
| Personal Information | Manager | |
| Country | | |
| Passcode | 1234 | |
| Duress Code | | |

AUTHENTICATED AND FUNCTIONAL SMS LINKS

CROSS-REFERENCE TO RELATED APPLICATIONS

This application claims the benefit of U.S. provisional application Ser. No. 62/327,109 filed Apr. 25, 2016 and Ser. No. 62/346,140 filed Jun. 6, 2016, the disclosures of which are hereby incorporated in their entirety by reference.

TECHNICAL FIELD

This invention relates to authenticated and functional short message service ("SMS") links for use in alarm security computer systems and other web-based systems.

BACKGROUND

Short message service ("SMS") is a text messaging service that uses standardized communication protocols to allow fixed line or mobile phone devices to exchange short text messages. The use of SMS notifications with alarm security computer systems and other web-based systems has been limited. Because of these limitations, the computer and web-based systems lack the ability to be directly accessed from SMS notifications.

SUMMARY

In one embodiment, a computer system for creating pre-authenticated, functional URLs within SMS messages is disclosed. The computer system includes a computer having non-transitory memory for storing machine instructions that are to be executed by the computer. The machine instructions when executed by the computer implement the following functions: receiving a login ID and passcode of an alarm management system user; receiving a specific function to be utilized by the alarm management system user; generating a URL that embeds the login ID, passcode and specific function to create a pre-authenticated, functional URL; combining a text message string with the pre-authenticated, functional URL to create an SMS message; and transmitting the SMS message.

In another embodiment, a computer readable medium having non-transitory memory for storing machine instructions that are to be executed by the computer is disclosed. The machine instructions when executed by the computer implements the following functions: receiving a login ID and passcode of an alarm management system user; receiving a specific function to be utilized by the alarm management system user; generating a URL that embeds the login ID, passcode and specific function to create a pre-authenticated, functional URL; combining a text message string with the pre-authenticated, functional URL to create an SMS message; and transmitting the SMS message.

In yet another embodiment, a method for creating pre-authenticated, functional URLs within SMS messages is disclosed. The method includes the following steps: receiving a login ID and passcode of an alarm management system user; receiving a specific function to be utilized by the alarm management system user; generating a URL that embeds the login ID, passcode and specific function to create a pre-authenticated, functional URL; combining a text message string with the pre-authenticated, functional URL to create an SMS message; and transmitting the SMS message.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Short message service ("SMS") notifications applied to alarm monitoring software are known. The SMS notification includes information relating to an alarm. However, the known SMS notifications do not include a web link to link the SMS notification with alarm event and monitoring software. Accordingly, the user cannot directly access the alarm event and monitoring software from an SMS message.

In one or more embodiments, the present disclosure relates to SMS gateway system that provides pre-authenticated, functional uniform resource locators ("URLs") or links within SMS messages. These SMS messages can be customized for a specific user to send the user directly to a web-based portal in real-time without the user completing a login screen. Also, since the link is customized for the user, the link can direct the user to specific and customized contact, features and functionality of the alarm event and monitoring software. This technology can also be used to provide other pre-authenticated, functional URLs within SMS messages as set forth herein.

Figure 1:
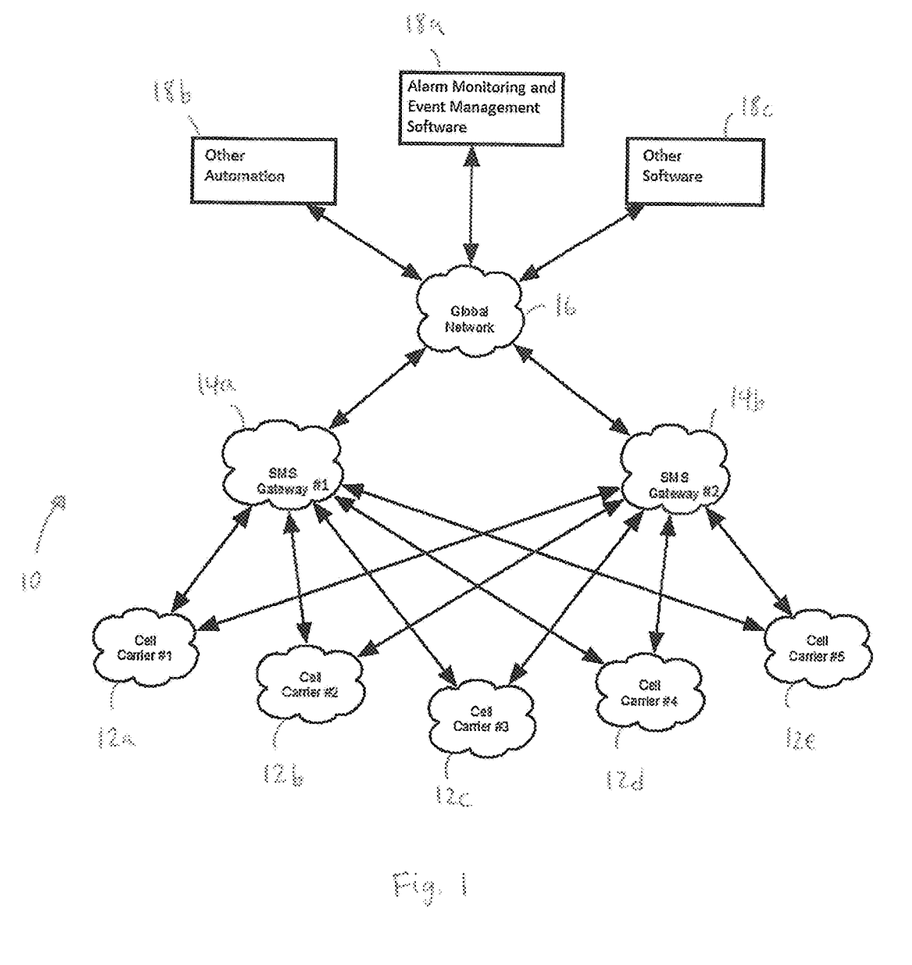
FIG. 1 depicts a system architecture for a short message service ("SMS") gateway according to one embodiment.

FIG. 1 depicts a system architecture for an SMS gateway 10 according to one embodiment. The system includes a number of cell carriers 12a, 12b, 12c, 12d and 12e, first and second SMS gateways 14a and 14b, a global network 16, and software modules 18a, 18b and 18c. Each cell carrier 12a, 12b, 12c, 12d and 12e is in two-way communication with each SMS gateway 14a and 14b. A non-limiting example of each SMS gateway 14a and 14b is an IPtelX center. Each SMS gateway 14a and 14b is in two-way communication with global network 16. A non-limiting example of global network 16 is an IPtelX global network. Global network 16 is in two-way communication with each software module 18a, 18b and 18c. Software module 18a includes monitoring and event management software. A non-limiting example of software module 18a is DICE Matrix Software. Software module 18a may include automation modules. Software module 18a may also include a web-enabled portal system for users to interact with features and functionality of the monitoring and event management software. Software module 18b includes automation modules other than those included in software module 18a. Software module 18c includes software modules other than those included in software module 18a. The system architecture described in FIG. 1 can be used to transmit and receive pre-authenticated, functional URLs within SMS messages, as set forth herein.

Figure 2:
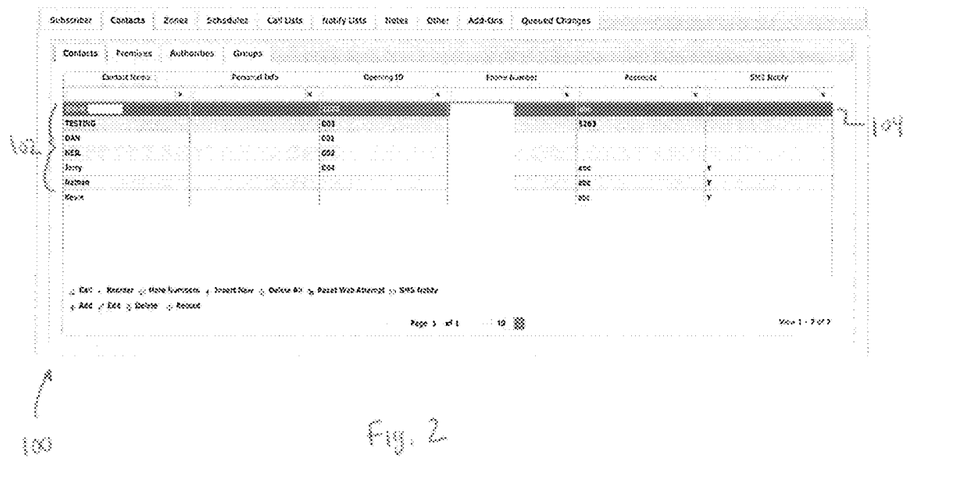
FIG. 2 is a graphical user interface ("GUI") for setting up contacts within the SMS gateway, which includes alarm monitoring and event management software.

FIG. 2 is a graphical user interface ("GUI") 100 for setting up contacts within the the software module 18a. GUI 100 includes a display list 102 of contact record. Each contact record 104 includes information relating to the contact, such as contact name, personal information, opening ID, phone number, passcode, and SMS notify flag. An administrator of software module 18a can input and edit the contact information shown in each contact record 104. If the SMS notify tag is set to "Y," then the pre-authenticated, functional URLs within the SMS messages feature is enabled for the corresponding contact. The opening ID and passcode is used by the pre-authenticated, functional URLs within SMS messages feature as described herein. The contact information is stored so that it is accessible by the software module 18a.

Figure 3:
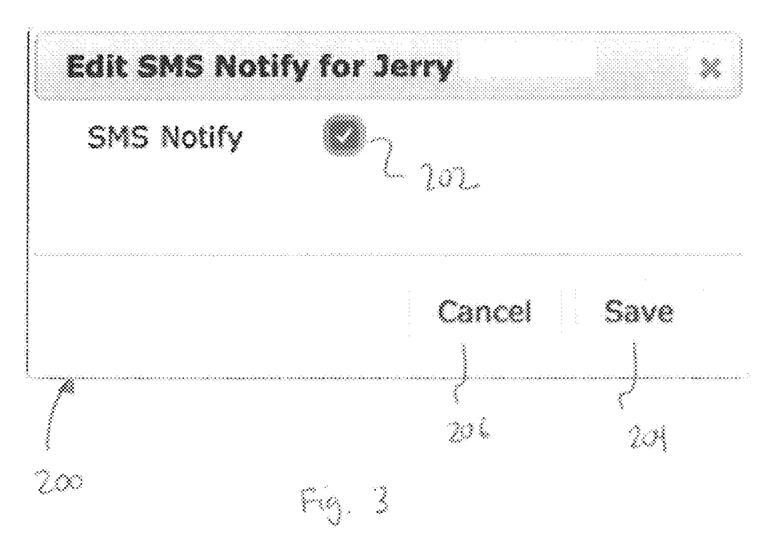
FIG. 3 is a GUI for changing the value of an SMS notify flag according to one embodiment.

FIG. 3 is GUI 200 for changing the value of the SMS notify flag. GUI 200 includes an SMS Notify click box 202. As shown in FIG. 3, click box 202 is selected, denoting that the user's SMS notify flag is set to "Y." GUI 200 includes a Save button 204 and a Cancel button 206. The Save button 204 saves the current setting in click box 202 and the Cancel button 206 cancels operation of GUI 200. The SMS notify flag value is stored so that it is accessible by the software module 18a.

Figure 4:
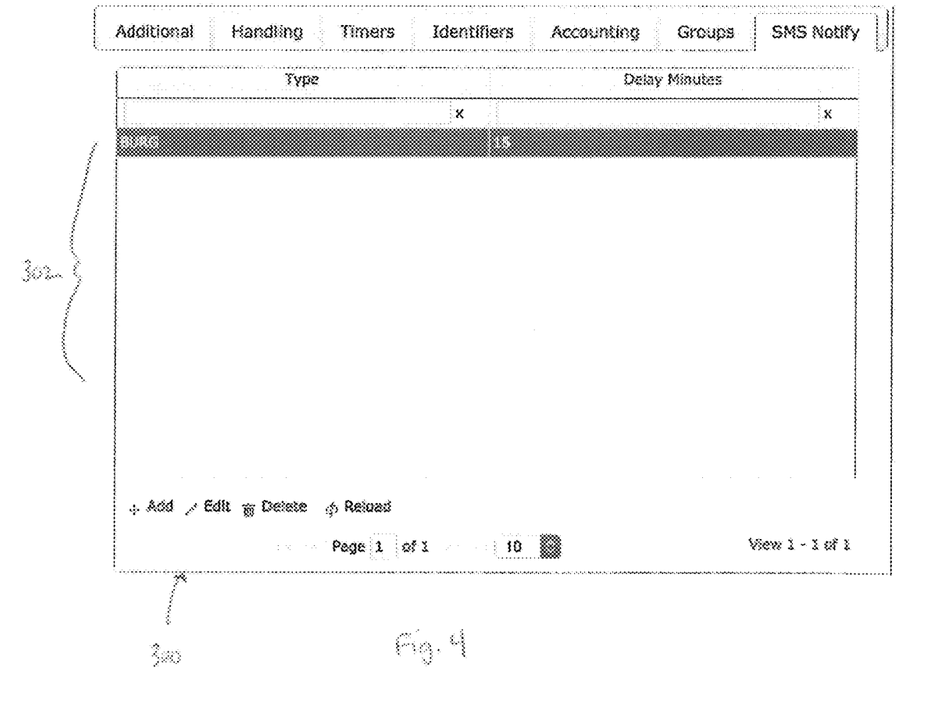
FIG. 4 is a GUI for setting an SMS notify type according to one embodiment.

FIG. 4 is GUI 300 for setting the SMS notify type. GUI 300 includes a display list 302 of notify types. As shown in FIG. 4, information is presented for the "BURG" notify type, which is a burglary notify type. The information also includes the number of delay minutes of 15 minutes for the burglary notify type. The notify type information is stored so that it is accessible by the software module 18a.

Figure 5:
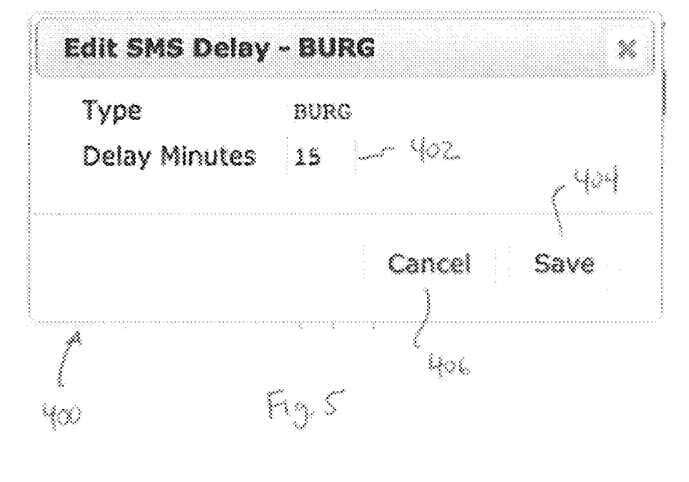
FIG. 5 is a GUI for editing an SMS notify type according to one embodiment.

FIG. 5 is GUI 400 for editing the SMS notify type. As shown in FIG. 5, the "BURG" notify type is being edited. Text field 402 can be edited to change the delay minutes for the burglary notify type. As shown in FIG. 5, the delay minutes are set to 15 minutes. GUI 400 includes a Save button 404 and a Cancel button 406. The Save button 404 saves the current setting in text field 402 and the Cancel button 406 cancels operation of GUI 400. The notify type information is stored so that it is accessible by the software module 18a.

Figure 6:
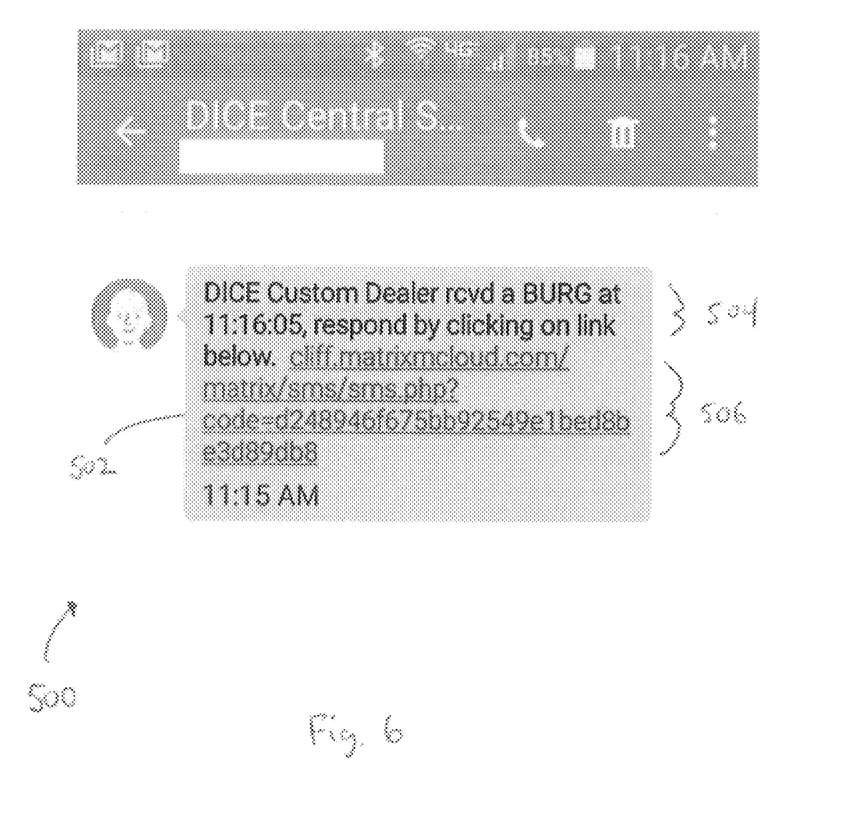
FIG. 6 depicts a SMS text user interface according to one embodiment.

FIG. 6 depicts a SMS text user interface 500. As shown in FIG. 6, a text message 502 is displayed within SMS text user interface 500. Software module 18a generates the text message 502 and transmits it to a contact as identified in the contact information described above. The text message 502 includes text notification 504 and a URL 506. The text notification 504 notifies the contact of information relating to a notify type. In the case of this specific example, the notify type is "BURG." The text notification 504 identifies when the burglary alarm has been received. The URL 506 is a link that can be selected by the contact to respond to the burglary alarm notification.

The URL 506 is a pre-authenticated and functional URL link. The URL link embeds authentication information for the web-based portal system of software module 18a. Accordingly, when the contact selects the link, the contact can automatically access the web-based portal system without inputting any ID or passcode information. The URL link also embeds information relating to the notify type and/or an address of specific web-based portal system functionality. The embedded information may be a text message string that includes an identification of a specific alarm function. For example, the notify type information is related to notify type "BURG" and the address of specific web-based portal system functionality relates to a burglary alarm notification.

Figure 7:
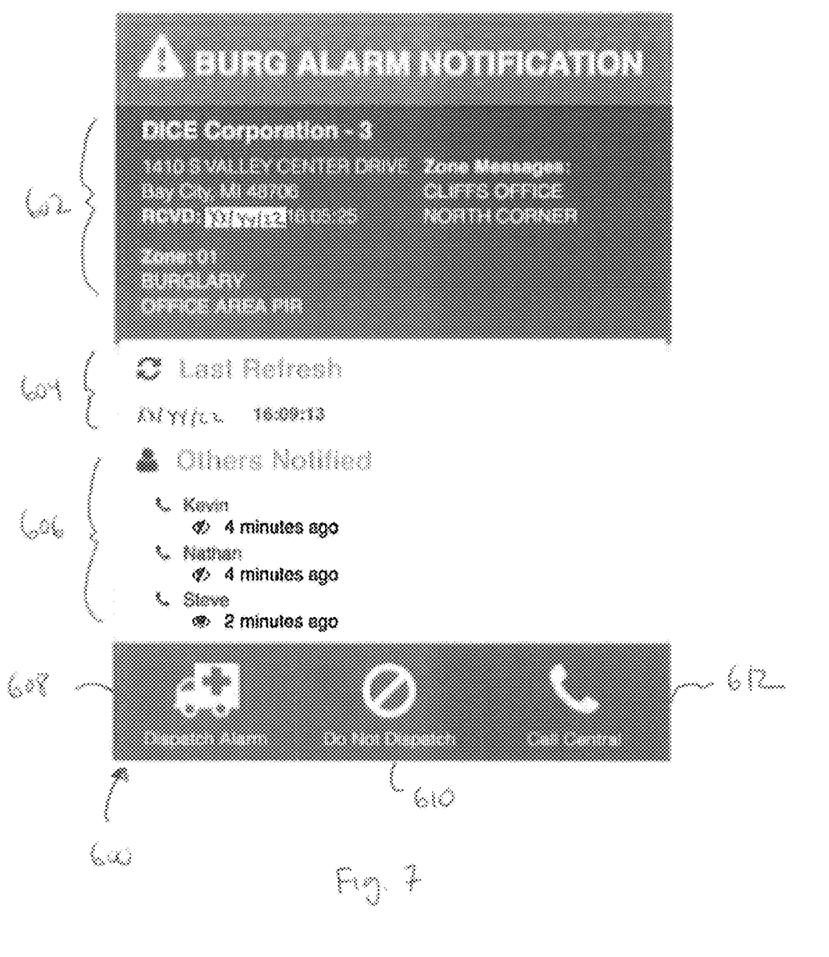
FIG. 7 depicts a burglary alarm notification webpage that can be directly accessed using a pre-authenticated and functional URL link.

FIG. 7 depicts a burglary alarm notification webpage 600 that can be directly accessed using a pre-authenticated and functional URL link. The webpage can be part of the web-based portal system. The web page is viewable on a smart device, such as a phone, tablet, or PC with a messenger function. The webpage 600 includes information 602 regarding the burglary alarm, including, but not limited to, an address, time, zone and zone message for the alarm. Field 604 of webpage 600 includes the date and time of the last refresh for the burglary alarm notification. Fields 606 of webpage 600 include the other contacts that received the burglary alarm. The other contacts may be family members. Fields 606 include an eyeball icon for each contact. The eyeball icon has a slash through it if the contact has not viewed the SMS message. The eyeball icon does not have a slash through it if the contact has viewed the SMS message. The webpage 600 also includes three click buttons, i.e., dispatch alarm button 608, do not dispatch button 610 and call center button 612. If the dispatch alarm button 608 or the call center button 612 is selected, then the web-based portal system would route a call to a call center and the alarm information so that an operator could handle them combined as a customer relation event. If the do not dispatch button 610 is selected by the contact, the webpage 600 prompts the contact for a code. The code could be an authorized cancel code. The contact could also input a duress code if the contact is under a hostage situation and is being forced to cancel the alarm.

All contacts with the capability to access webpage 600 can view the actions of other contacts in real-time. For example, if one contact selects the dispatch alarm button 608, the other contacts would be able to view the selected dispatch, and view when an operator is dispatched, and view any messages typed in by the center agent, such as, remarks by the police. Other activities by the center agent will also be viewable. The central agent may call other responders to meet the police with keys and the webpage may display information, such as estimated time of arrival by a key holder. The central agent may also update the information with other messages such as "premise was found secure" or "broken windows." This information would also be viewable by all related contacts.

Figure 8:
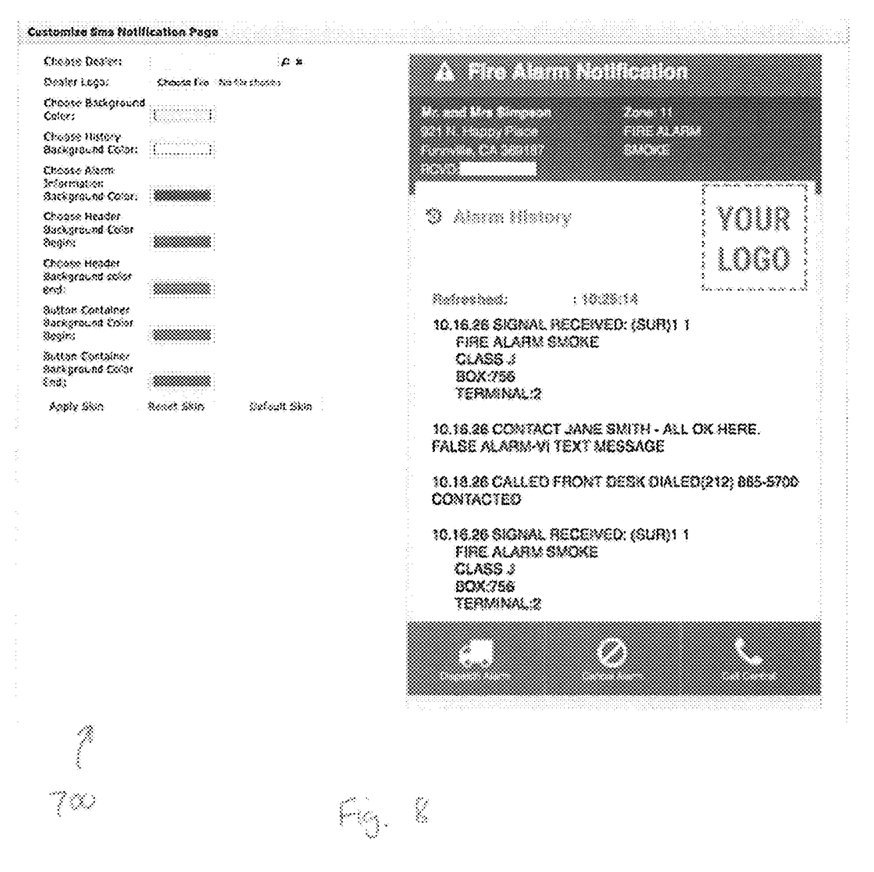
FIG. 8 depicts a webpage for customizing an SMS notification page according to one embodiment.

FIG. 8 depicts a webpage 700 for customizing an SMS notification page. Webpage 700 permits a user to select colors for different areas of the webpage and also insert an alarm dealer logo.

Other authenticated, functional links can be provided through SMS messages according to one or more embodiments. For example, a billing link can be provided to allow pre-authenticated access to a billing webpage to pay a bill using a credit card, checking account, PAYPAL® PAYMENTS, APPLE PAY®, etc. As another example, a credit card update link can be provided to allow pre-authenticated access to a credit card update webpage to allow a user to update credit card billing information. Another example is a past due link to allow pre-authenticated access to a webpage to pay a past due bill using a credit card, checking account, PAYPAL® PAYMENTS, APPLE PAY®, etc. Another link is a service appointment link that includes information regarding a scheduled appointment and requesting authorization of the appointment through the link. The service appointment link can be provided to allow pre-authenticated access to a service appointment webpage to authorize the appointment. The link may also include information, such as the user's absence at a scheduled service time, which may result in a default charge. As another example, a contact update list link can be provided. The link will direct the user to a webpage that displays contacts within a contact list and requests the user to update the list to ensure that the phone numbers are accurate in the case of an emergency. The webpage also includes functionality to add contacts for protected premises and delete contacts and modify phone numbers, and provide passcodes for alarm cancellations and duress codes for hostage situations. Yet another link is a quality inspection link. The SMS message will include a link to a webpage to rate the service of the people who worked at a customer's premises from an alarm company. These and other authenticated, functional links can be provided through SMS messages according to one or more embodiments.

Figure 9:
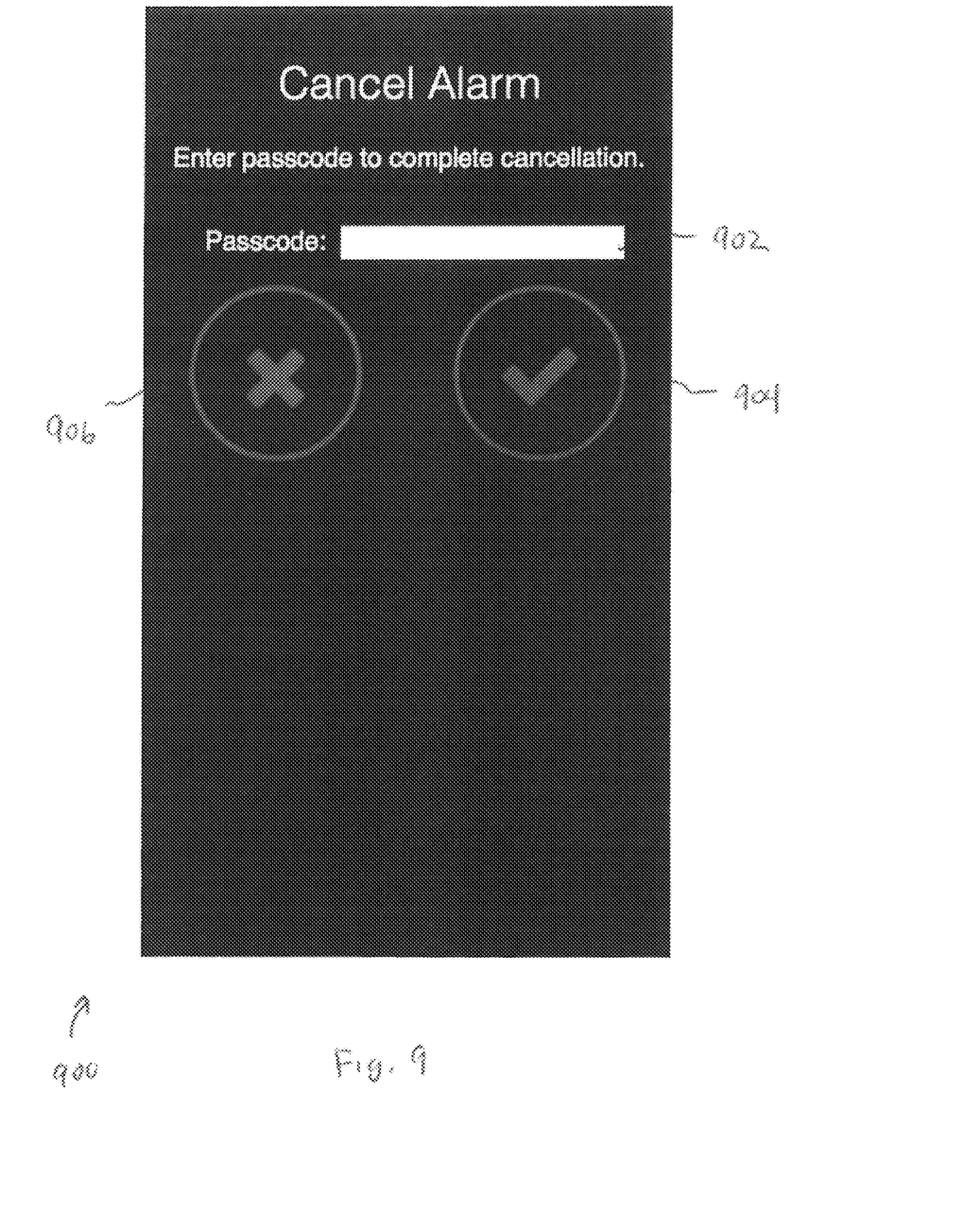
FIG. 9 depicts a GUI for cancelling an alarm according to one embodiment.

FIG. 9 depicts a GUI 900 for cancelling an alarm according to one embodiment. If a user clicks on the do not dispatch button 610 shown in FIG. 7, then GUI 900 is displayed. The GUI 900 prompts the user for a code in field 902. The code could be an authorized cancel code. The contact could also input a duress code if the contact is under a hostage situation and is being forced to cancel the alarm. Once the code is entered, the user selects icon 904 to activate cancellation of the alarm. The user also has the option to cancel GUI 900 by selecting icon 906.

Figure 10:
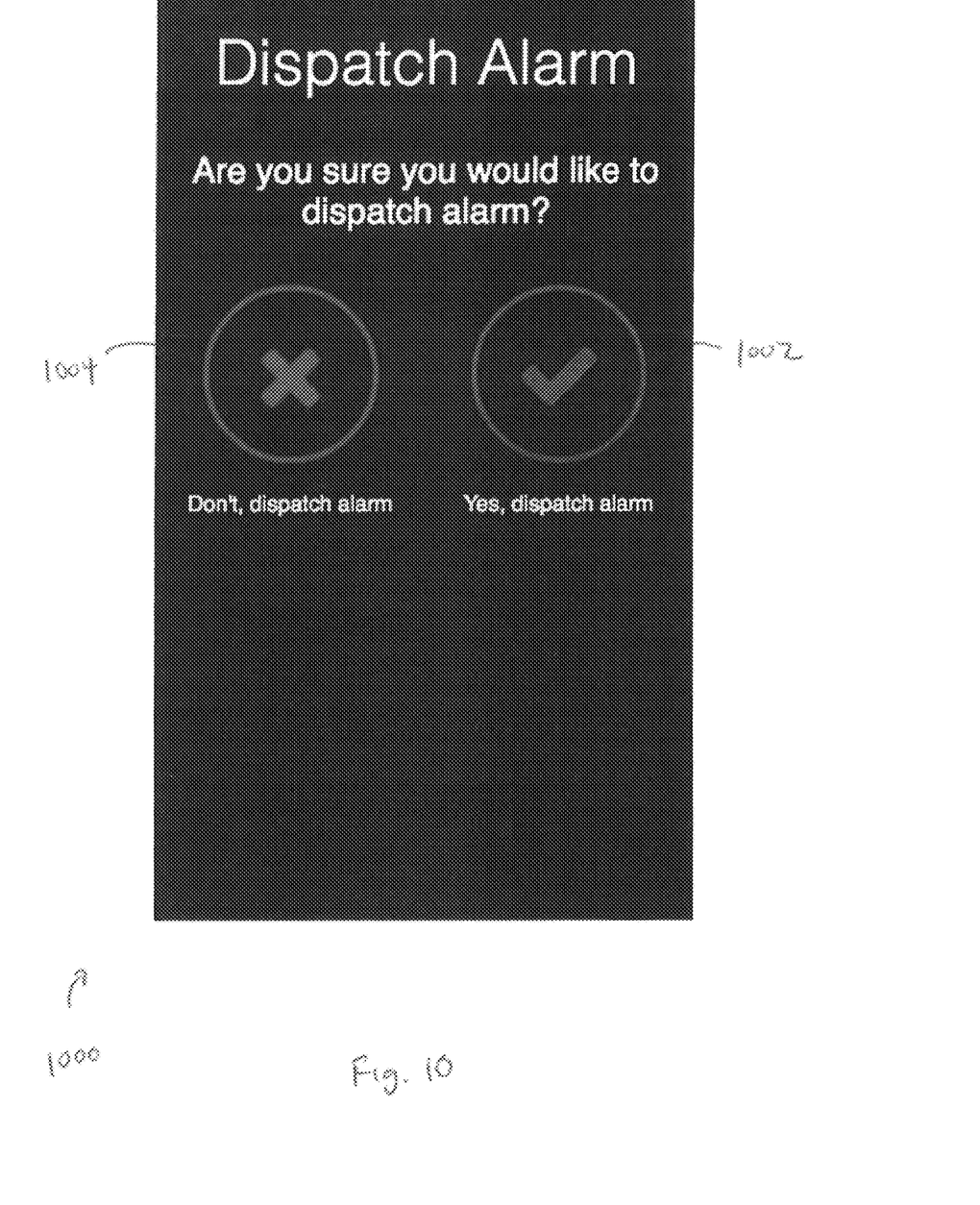
FIG. 10 depicts a GUI for dispatching an alarm according to one embodiment.

FIG. 10 depicts a GUI 1000 for dispatching an alarm according to one embodiment. If a user clicks on the dispatch alarm button 608 shown in FIG. 7, then GUI 1000 is displayed. The GUI 1000 prompts the user confirm dispatch of an alarm by selecting icon 1002 or cancelling the dispatch request by selecting icon 1004.

Figure 11:
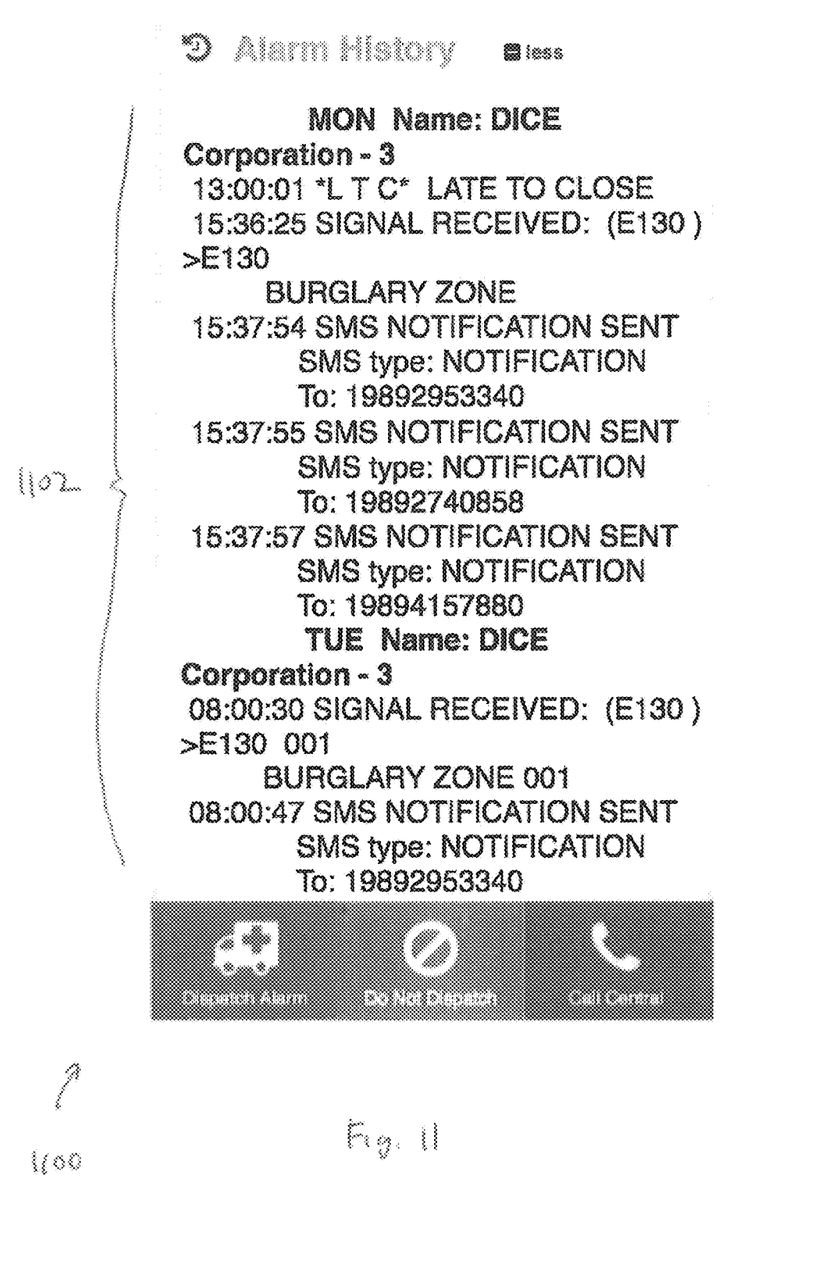
FIG. 11 depicts a webpage showing a scrolling history of events associated with an alarm according to one embodiment.

FIG. 11 depicts a webpage 1100 showing a scrolling history of events associated with an alarm according to one embodiment. In window 1102 of webpage 1100, a scrolling history of events associated with an alarm that a user is responding to is presented.

Figure 12:
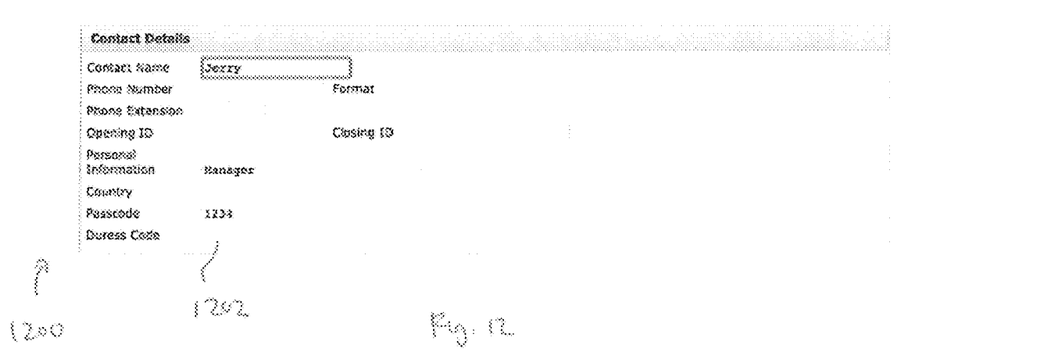
FIG. 12 depicts a GUI for inputting a duress code according to one embodiment.

FIG. 12 depicts a GUI 1200 for inputting a duress code according to one embodiment. The duress code can be input into field 1202 of GUI 1200. The duress code is provided to the central station in the event the user is under duress and if entered it alerts the central station that the user is in trouble and needs help, but does not want the individuals present to know.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. A computer system for creating pre-authenticated, functional URLs within SMS messages, the computer system includes:
   a computer having non-transitory memory for storing machine instructions that are to be executed by the computer, the machine instructions when executed by the computer implement the following functions:
   receiving a login ID and passcode of an alarm management system user; receiving a specific alarm function to be utilized by the alarm management system user;
   generating a URL that embeds and codes the login ID, passcode and specific alarm function to create a pre-authenticated, functional URL configured to access a specific web-based portal alarm system functionality;
   combining a text message string with the pre-authenticated, functional URL to create an SMS message;
   wherein the text message string includes an identification of the specific alarm function,
   and transmitting the SMS message to the alarm management system user.

2. The computer system of claim 1, wherein the specific alarm function is a burglary alarm notification.

3. The computer system of claim 1, wherein the text message string includes a time stamp associated with an occurrence of the specific alarm function.

4. The computer system of claim 1, wherein the URL embeds and codes an address of the specific web-based portal alarm system functionality.

5. The computer system of claim 1, wherein the URL embeds and codes a notify type associated with the specific alarm function.

6. The computer system of claim 1, wherein the specific alarm function is a burglary alarm notification, an alarm cancel, an alarm dispatch, or a scrolling history of alarm events.

7. A computer readable medium comprising:
   non-transitory memory for storing machine instructions that are to be executed by a computer, the machine instructions when executed by the computer implement the following functions:
   receiving a login ID and passcode of an alarm management system user;
   receiving a specific alarm function to be utilized by the alarm management system user;
   generating a URL that embeds and codes the login ID, passcode and specific alarm function to create a pre-authenticated, functional URL configured to access specific web-based portal alarm system functionality;
   combining a text message string with the pre-authenticated, functional URL to create an SMS message;
   wherein the text message string includes an identification of the specific alarm function,
   and transmitting the SMS message to the alarm management system user.

8. The computer readable medium of claim 7, wherein the specific alarm function is a burglary alarm notification.

9. The computer readable medium of claim 7, wherein the text message string includes a time stamp associated with an occurrence of the specific alarm function.

10. The computer readable medium of claim 7, wherein the URL embeds and codes an address of the specific web-based portal alarm system functionality.

11. The computer readable medium of claim 7, wherein the URL embeds and codes a notify type associated with the specific alarm function.

12. A method for creating pre-authenticated, functional URLs within SMS messages, the method comprising:

receiving a login ID and passcode of an alarm management system user; receiving a specific alarm function to be utilized by the alarm management system user;

generating a URL that embeds and codes the login ID, passcode and specific alarm function to create a pre-authenticated, functional URL configured to access specific web-based portal alarm system functionality:

combining a text message string with the pre-authenticated, functional URL to create an SMS message;

wherein the text message string includes an identification of the specific alarm function, and transmitting the SMS message to the alarm management system user.

13. The method of claim 12, wherein the specific alarm function is a burglary alarm notification.

14. The method of claim 12, wherein the text message string includes a time stamp associated with an occurrence of the specific alarm function that is embedded and coded into the URL.

15. The method of claim 12, wherein the text message string includes a time stamp associated with an occurrence of the specific alarm function.

16. The method of claim 12, wherein the URL embeds and codes an address of the specific web-based portal alarm system functionality.

17. The method of claim 12, wherein the URL embeds and codes a notify type associated with the specific alarm function.

* * * * *